July 6, 1943.  G. McNAB  2,323,875
CUTTING MACHINE
Filed Jan. 28, 1942  4 Sheets-Sheet 1

INVENTOR
GEORGE McNAB
BY Oswald G. Hayes
ATTORNEY

July 6, 1943.   G. McNAB   2,323,875
CUTTING MACHINE
Filed Jan. 28, 1942   4 Sheets-Sheet 2
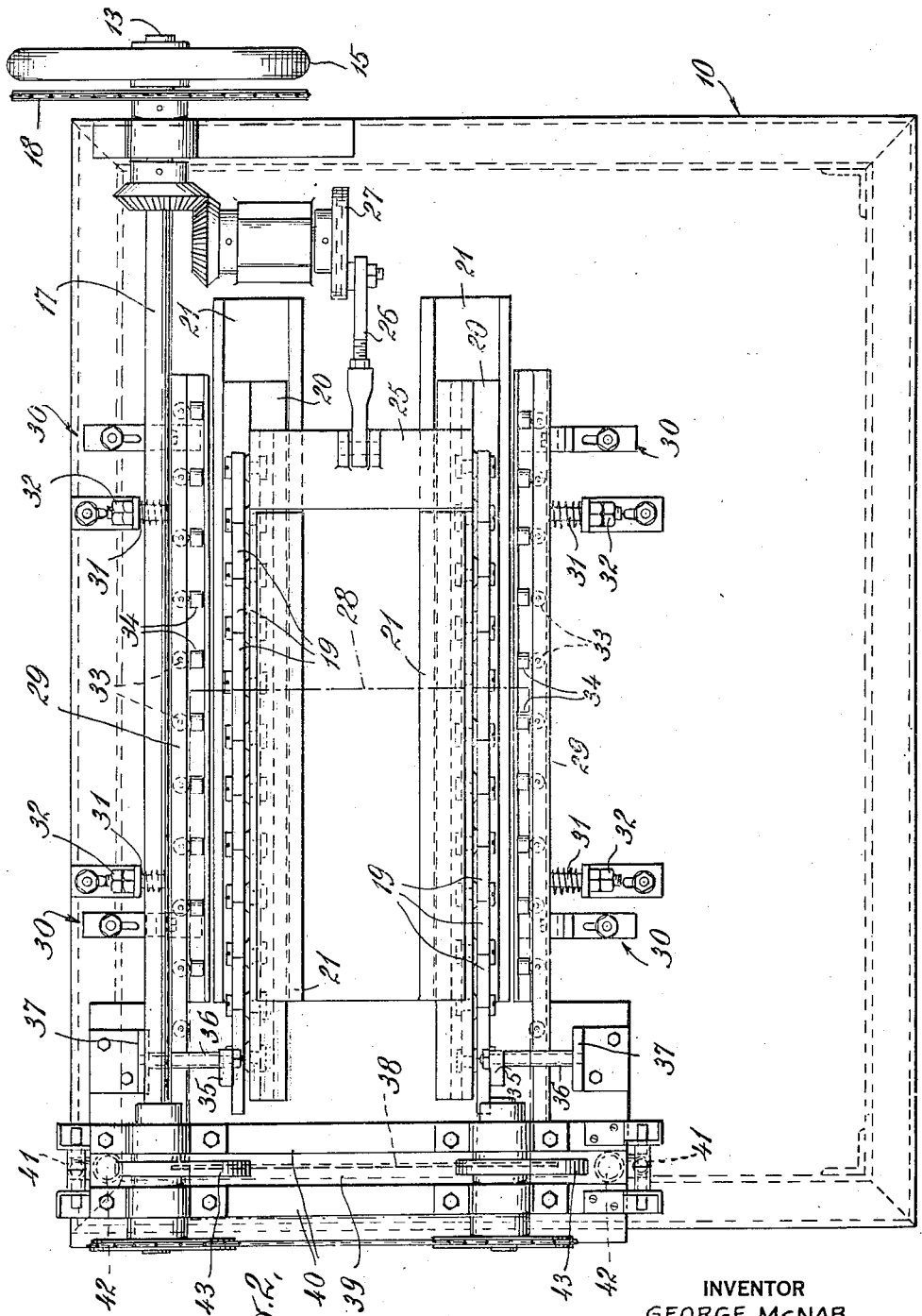
INVENTOR
GEORGE McNAB
BY Oswald G. Hayes
ATTORNEY

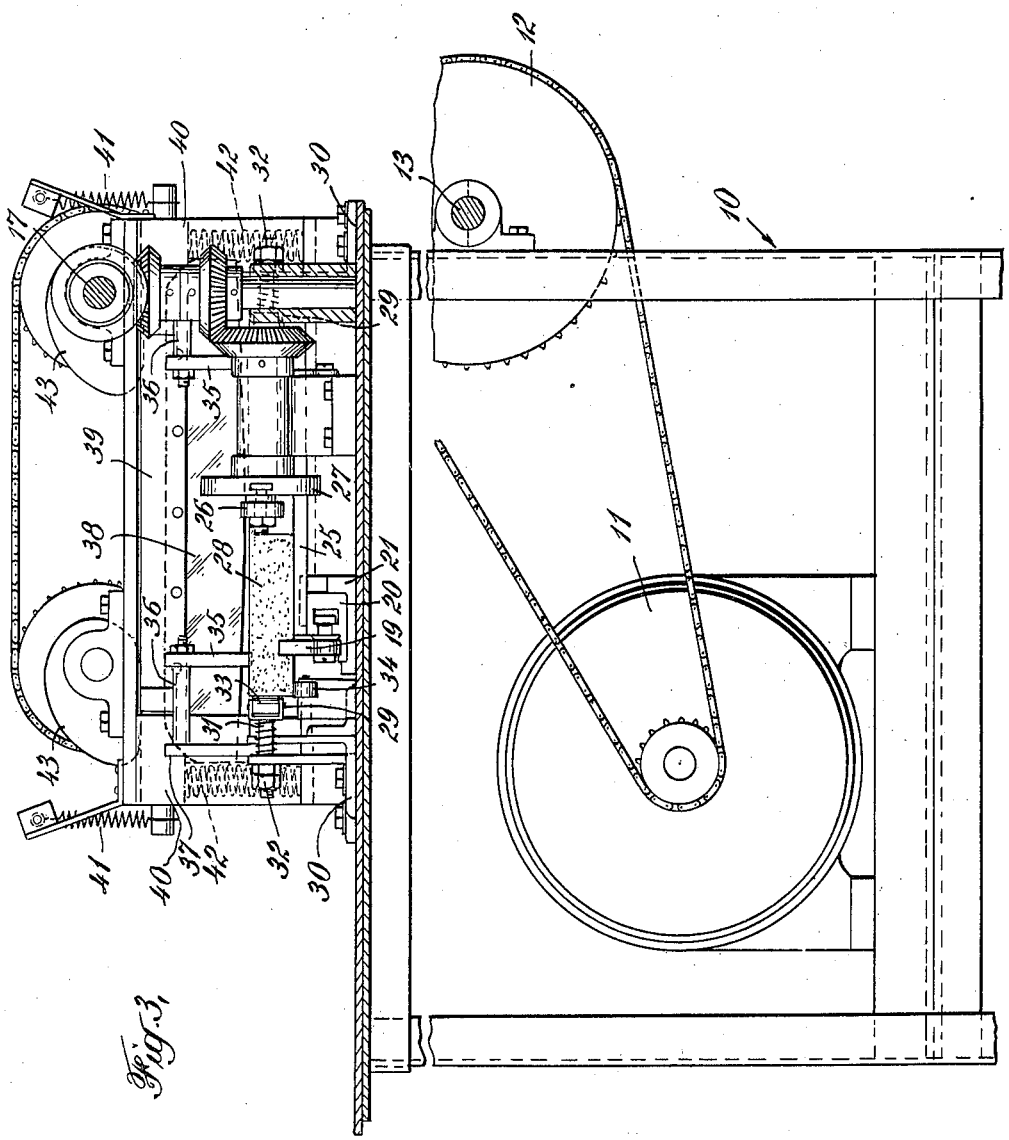

July 6, 1943.   G. McNAB   2,323,875
CUTTING MACHINE
Filed Jan. 28, 1942   4 Sheets-Sheet 4
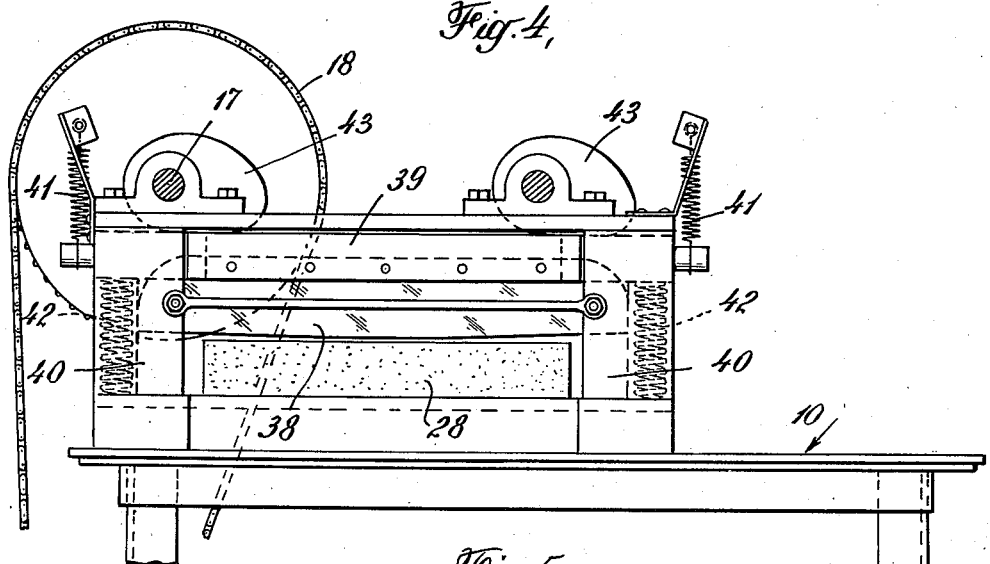
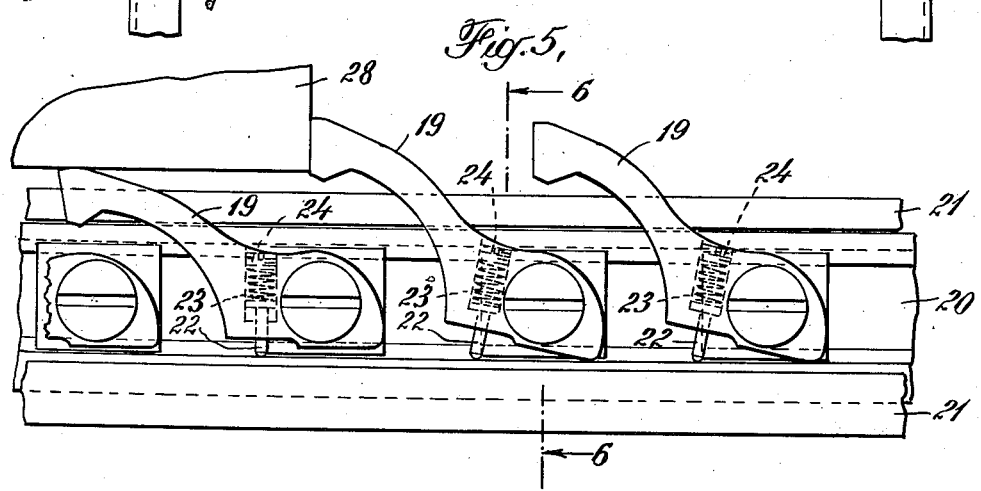
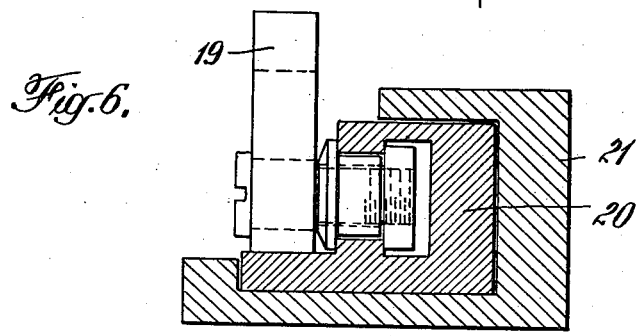
INVENTOR
GEORGE McNAB
BY
ATTORNEY Patented July 6, 1943

2,323,875

UNITED STATES PATENT OFFICE 2,323,875

CUTTING MACHINE

George McNab, Woodbury, N. J., assignor to Socony-Vacuum Oil Company, Incorporated, New York, N. Y., a corporation of New York Application January 28, 1942, Serial No. 428,573

2 Claims. (Cl. 25—107)

This invention relates to a machine for cutting pieces or slabs of desired thickness continuously and accurately from a cake of material such as waxes and the like.

The invention contemplates a machine including means for step-wise advancement of a suitable cake of the material to be cut along a horizontal plane and coordinated action of a vertically reciprocating knife to slice off portions of a thickness corresponding to the distance the cake advances in each step. This purpose is accomplished by the employment of a device as illustrated in the annexed drawings wherein:

Figure 2 is a plan view of the same;

Figure 3 is a section view in elevation on line 3—3 of Figure 1;

Figure 4 is a fragmentary section in elevation on line 4—4 of Figure 1;

Figure 5 is a detail view of means for advancing the cake; and

Figure 6 is a detail in partial section on line 6—6 of Figure 5.

Figure 1:
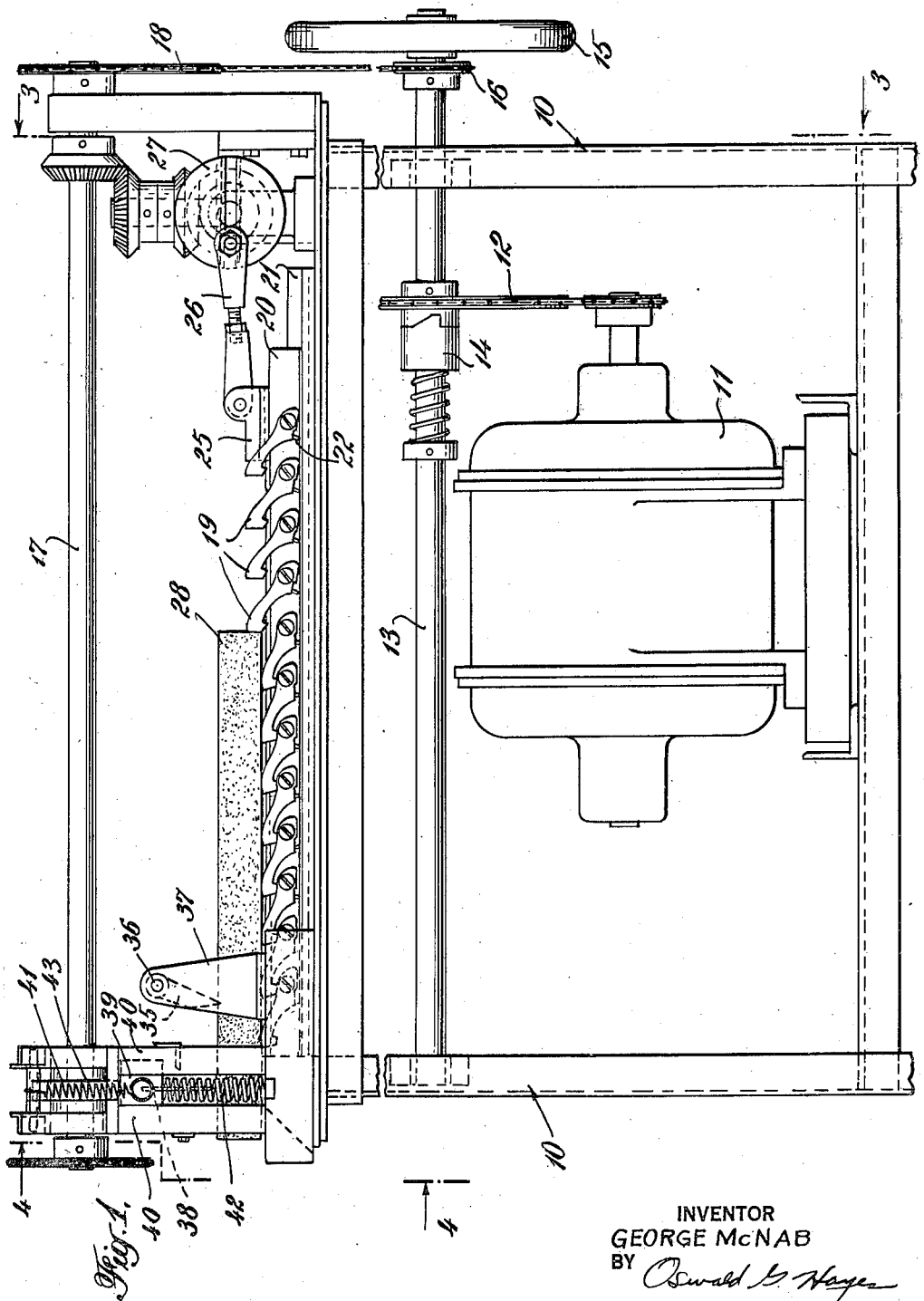
Figure 1 is a side elevation of a machine constituting a preferred embodiment of the invention.

Referring now to Figures 1 to 4, inclusive, the machine includes a supporting frame indicated generally at 10 of any suitable structure carrying the operating parts on an upper surface thereof and having the driving mechanism supported below said surface. Power is furnished by a prime mover such as the electric motor 11 and communicated to the operating mechanism by a train, including a sprocket wheel 12 mounted for rotation about a shaft 13 supported on the frame by conventional bearings. The hub of sprocket 12 is formed to provide a spring held safety clutch of the jaw type with a collar 14 mounted on shaft 13 for rotation therewith, as by keys and keyways. At an end of the shaft 13, preferably that end corresponding to the feed end of the device, is a hand wheel 15 and a sprocket 16, the latter driving a power shaft 17 above the operating mechanism through a sprocket 18 keyed to said power shaft.

A wax cake placed in the machine for cutting to pieces of desired size is advanced to the cutting end and at least partially supported by a plurality of pawls 19 mounted in each of two pawl bars 20 carried on the upper surface of the frame 10 for longitudinal reciprocation in guide ways 21. Each pawl 19 is constructed and mounted in the manner indicated in detail Figures 5 and 6 with a pivotal connection to pawl bar 20 permitting oscillation about a horizontal axis at right angles to the direction of reciprocation of said pawl bar. In the body of each pawl 19 is a pin 22 passing through an opening directed generally downward through the body of the pawl to contact a flat surface of pawl bar 20 thereunder. The body of the pawl is tapped on the center line of said opening to receive the flat head of each of said pins and provide a limiting abutment for outward movement of the pin. An extension spring 23, held in the tap in the pawl body by a retaining screw 24, tends to force the pin outward and maintain the head thereof in contact with said abutment. Thus each pawl tends to assume a raised position under the influence of pin 22 as urged downwardly by the spring 23.

The two pawl bars are caused to reciprocate together by being secured to a cross-head 25, operatively connected to a connecting rod 26 having its opposite end eccentrically pivoted to a wheel 27 rotated by the illustrated train of gears from power shaft 17. On opposite sides of the space for wax cake 28 are fences 29 for keeping the cake properly oriented in the machine, the said fences being adjustably mounted on the device in any suitable manner as by the slides indicated generally at 30 and the adjusting rods 31 spring urged to extended position, but having lock nuts 32 adjusted to limit movement thereof.

As shown in Figure 3, the fences 29 carry rollers 33 to contact the edges of the wax cake and the cake lies on rollers 34 suitably supported from the frame 10. Although in actual operation, the cutting knife itself will usually restrain backward motion of the wax cake as the pawl bars move in the return stroke of their cycle, means are provided to positively prevent motion of the wax cake backward from the cutting edge. These means include, in the present embodiment, a dog 35 mounted for rotation about a horizontal shaft 36 extending from a bracket 37 attached to the frame 10. If, upon the return stroke of the pawl bars 20, there is any tendency of the wax cake to move backward, the point of the dog 35 enters the upper surface of the cake and restrains its backward motion.

The cutting is done by a vertically reciprocating knife 38 mounted in a block 39 sliding in an upright support assembly 40 on the frame 10. The block 39 is provided at each end with extension springs 41 and compression spring 42 tending to bring the block to its upper limit of travel. Downward movement of the block 39 and knife 38 is caused by positive action on the upper surface of the block by cams 43 driven from the power shaft 17 as shown.

It will be apparent that, upon power being supplied to rotate the power shaft 17, as by means of motor 11, the pawl bars will be reciprocated, thus advancing a wax cake resting thereon a distance equal to the distance between centers of pawls 19. At the same time, knife 38 will be caused to reciprocate vertically cutting off a slice of desired thickness, equal to the said distance between centers, with each cut.

I claim:

1. In a device of the class described, a frame, a pair of parallel pawl bars mounted on said frame for longitudinal reciprocation, means for reciprocating said pawl bars in synchronism, a plurality of pawls carried by each of said pawl bars and mounted thereon for oscillation about axes at right angles to the length of said bars, each of said pawls being spring urged to a raised position, means for guiding in a desired manner a cake of material resting on at least a portion of said pawls and thereby depressing the same, a knife at one end of said pawl bars mounted for vertical reciprocation on said frame and means for reciprocating said knife in synchronism with reciprocation of said pawl bars.

2. In a device of the class described, a frame, a pair of parallel pawl bars mounted on said frame for longitudinal reciprocation, means for reciprocating said pawl bars in synchronism, a plurality of pawls carried by each of said pawl bars and mounted thereon for oscillation about axes at right angles to the length of said bars, each of said pawls being spring urged to a raised position, means for guiding in a desired manner a cake of material resting on at least a portion of said pawls and thereby depressing the same, a knife at one end of said pawl bars mounted for vertical reciprocation on said frame, means for restraining movement of said cake away from said knife, and means for reciprocating said knife in synchronism with reciprocation of said pawl bars.

GEORGE McNAB.